US005755294A

United States Patent [19]

Lee

[11] Patent Number: 5,755,294

[45] Date of Patent: May 26, 1998

[54] ABRASION-RESISTANT HYDRAULIC HAMMER WITH LOW NOISE LEVEL

[75] Inventor: Gun-jik Lee, Incheon, Rep. of Korea

[73] Assignee: Hyup Sung Heavy Industries Co., Ltd., Incheon, Rep. of Korea

[21] Appl. No.: 560,867

[22] Filed: Nov. 20, 1995

[30] Foreign Application Priority Data

Apr. 14, 1995 [KR] Rep. of Korea ........................ 95-7557

[51] Int. Cl.[6] ........................................ B23B 45/16

[52] U.S. Cl. ........................ 173/210; 173/128; 173/219; 173/171

[58] Field of Search .................................. 173/210, 211, 173/219, 128, 171

[56] References Cited

U.S. PATENT DOCUMENTS

| | | | |
|---|---|---|---|
| 3,168,324 | 2/1965 | Kennell | 173/210 |
| 3,566,978 | 3/1971 | Udert | 173/211 |
| 3,783,970 | 1/1974 | Danielson | 173/211 |
| 4,548,278 | 10/1985 | Gidlund | 173/211 |
| 4,614,241 | 9/1986 | Crover | 173/211 |
| 4,673,042 | 6/1987 | Steiner | 173/219 |
| 5,370,193 | 12/1994 | Sippus et al. | 173/211 |
| 5,431,235 | 7/1995 | Drumheller et al. | 173/211 |

*Primary Examiner*—Scott A. Smith
*Attorney, Agent, or Firm*—Dvorak & Orum

[57] ABSTRACT

There is provided an improved abrasion-resistant hydraulic hammer with a low noise level for preventing the leak-out of the noise made inside. The object is to provide an abrasion-resistant hydraulic hammer with a low noise level which can contribute to the establishment of a comfortable working environment and meet environmental standards against noise pollution by reducing leaked-out crashing sound. To achieve the object, a cylindrical plastic member containing oil is installed to a hole formed outward under a piston installed inside the hydraulic hammer, for guiding a tool in contact with the circumferential surface thereof.

3 Claims, 2 Drawing Sheets

ABRASION-RESISTANT HYDRAULIC HAMMER WITH LOW NOISE LEVEL

BACKGROUND OF THE INVENTION

The present invention relates to a hydraulic hammer for breaking a solid rock or concrete by operation using oil pressure, and more particularly, to an improved abrasion-resistant hydraulic hammer with a low noise level for preventing the noise made inside the hammer from being heard outside.

The hydraulic hammer is a device in which the oil pressure generated by a hydraulic pump is transferred to an oil passage, a piston installed inside the hammer moves up and down according to control of the oil passage and the oil pressure, to hit a tool, and the tool cracks a solid rock or concrete with the reaction force from the hitting. In the hydraulic hammer, therefore, the loudest noise and biggest vibration are made between the piston and the tool. Along with the recent reinforcement of environmental standards, however, restraint of noise pollution has been tightened. Therefore, the need for a low noise level hydraulic hammer is increased.

SUMMARY OF THE INVENTION

The object of the present invention is to provide a solid abrasion-resistant hydraulic hammer with a low noise level which can contribute to the establishment of a comfortable work environment and meet environmental standards against noise pollution by decreasing the level of leak-out crashing sound.

To achieve the above object, there is provided a hydraulic hammer with a low noise level, according to the present invention, comprising:

- a body;
- a piston installed inside the body for moving up and down;
- a hole formed outward under the piston in the body;
- a tool inserted into the hole for crashing into the piston when the piston descends; and
- a cylindrical plastic member containing oil provided to the hole for guiding the tool, in contact with the circumferential surface of the tool.

According to the present invention, another cylindrical metal bush is further provided to the entrance of the hole and the cylindrical plastic member containing oil is installed between the contact surfaces of the bush and the tool.

The abrasion-resistant hydraulic hammer with a low noise level as constituted above, according to the present invention, can contribute to the establishment of a comfortable working environment and can be used longer time by reducing crashing sound leaked out of the hammer.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
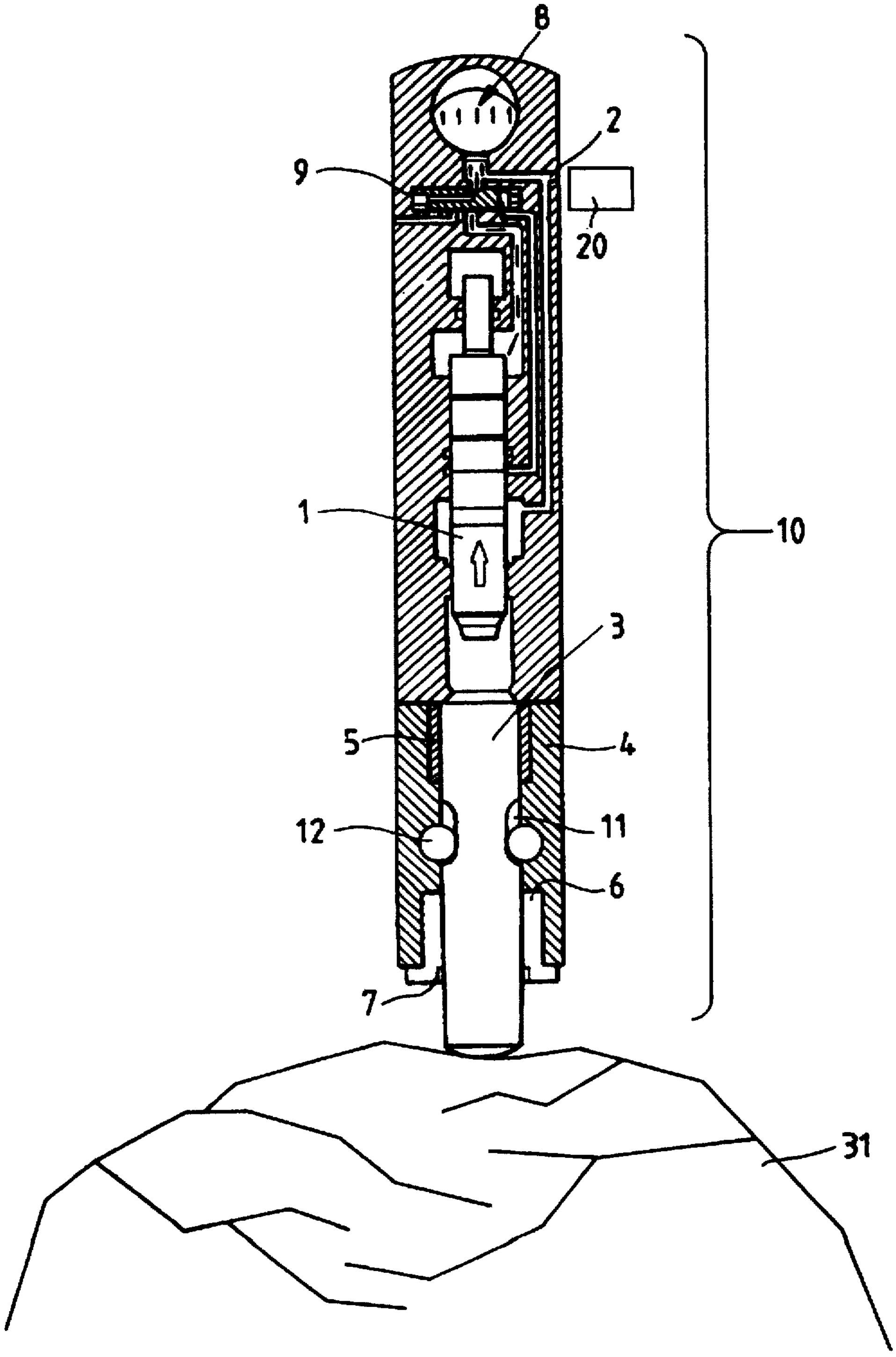
FIG. 1 PRIOR ART
FIG. 1 is a cross-sectional view of a main portion of a conventional hydraulic hammer.

FIG. 1 is a cross-sectional view of a main portion of a conventional hydraulic hammer. As shown, a piston 1 is installed inside a hydraulic hammer 10, and an oil passage 2 and various valves 9 are provided so that piston 1 may move up and down.

A tool 3 is installed under piston 1 and moves up and down by the guidance of an upper bush 5 and a lower bush 6 provided to the body 4 of the hydraulic hammer. A groove 11 is formed into the circumferential surface of tool 3 to a predetermined length. Since a tool pin 12 penetrates body 4 of the hydraulic hammer through groove 11, the up-and-down stroke of tool 3 depends on the length of groove 11. Tool 3 and lower bush 6 are made of metals and an annular rubber seal 7 is attached to lower bush 6.

In the hitting stroke of the hydraulic hammer as constituted above, the oil filling an accumulator 8 and the high-pressure oil from a pump 20 are provided to the upper and lower parts of piston 1, and thus piston 1 descends rapidly and hit tool 3. In this course, very big crashing sound and strong vibration are generated between tool 3 and piston 1 and with the reaction force from the crash, tool 3 crushes a rock.

Since tool 3 and lower bush 6 are made of metals, the contact surfaces of tool 3 and lower bush 6 are abraded due to the frictional force therebetween in the course of crushing a rock 31 by tool 3. In addition, the heat generated on the contact surfaces degrades rubber seal 7, to lower the sealing effects. Further, when dust and/or grains of sand blow(s) in between tool 3 and lower bush 6 in crushing rock 31 by tool 3, the abrasion of the contact surfaces is accelerated, thereby leaking out the inside crashing sound.

The leaked-out crashing sound deteriorates working environments and gives rise to restraint of operations according to noise pollution regulation which has been tightened along with the reinforcement of environmental standards. Therefore, the leak-out of noise remains a critical concern to be solved.

Figure 2:
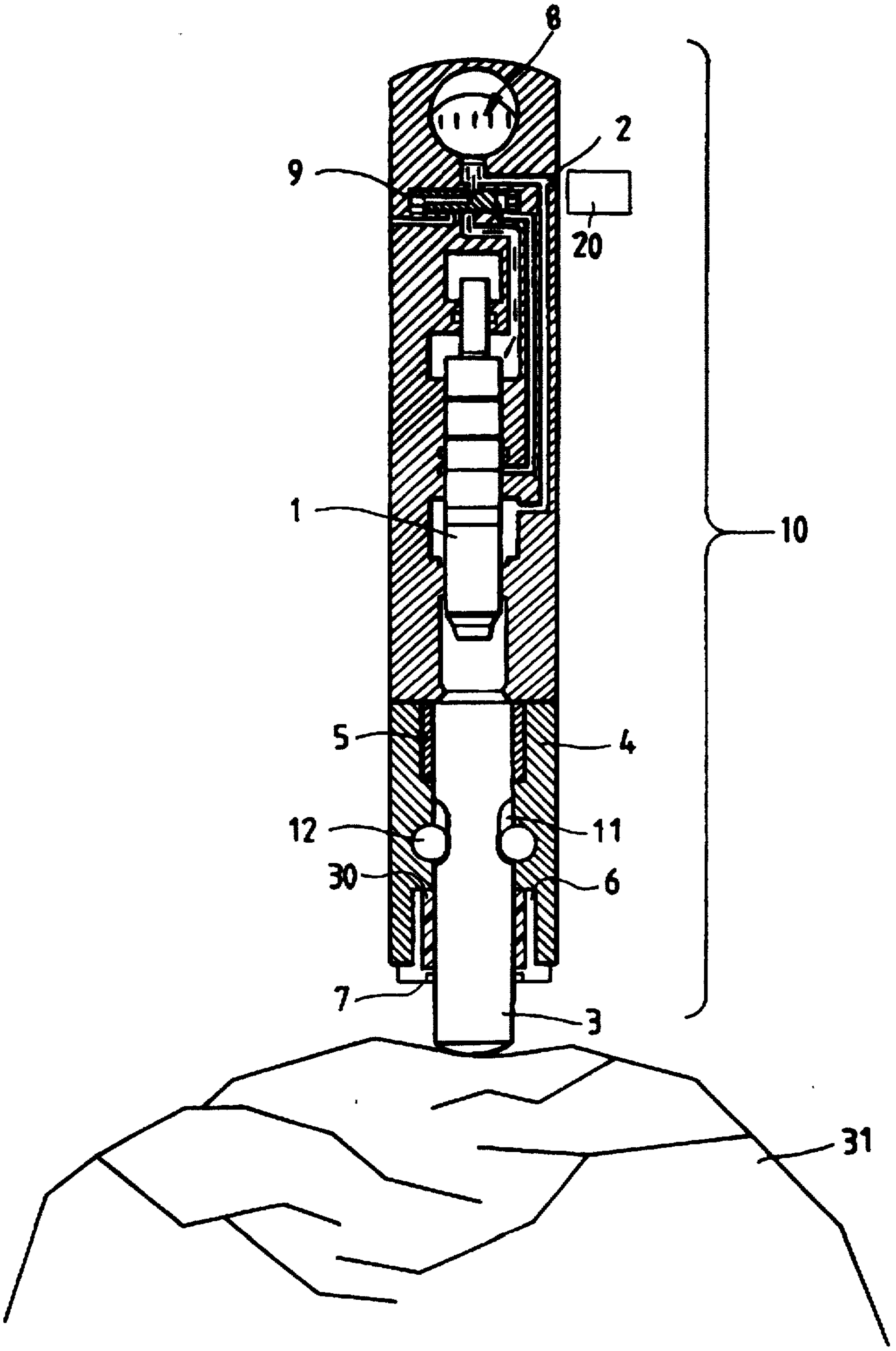
FIG. 2 is a cross-sectional view of a main portion of an abrasion-resistant hydraulic hammer with a low noise level according to the present invention.

FIG. 2 is a cross-sectional view of a main portion of an abrasion-resistant hydraulic hammer with a low noise level according to the present invention. As shown, a piston 1 is installed inside a hydraulic hammer 10, and a passage 2 and various valves 9 are provided for moving piston 1 up and down.

A tool 3 is inserted into a hole formed in a body 4 under piston 1, is brought into contact with an upper bush 5 and a lower bush 6 which are attached to the upper and lower parts of the hole, respectively, and moves up and down by the guidance thereof. A groove 11 is formed into the circumferential surface of tool 3 to a predetermined length. Since a tool pin penetrates body 4 through groove 11, the up-and-down stroke of tool 3 depends on the length of groove 11.

Upper bush 5 is made of a polyamide-series plastic containing oil with high abrasion resistance and a good sealing property. Therefore, the noise made when piston 1 hits tool 3 is firstly prevented by upper bush 5, thereby enabling the safe up-and-down motions of tool 3.

Tool 3 and lower bush 6 are made of metals. A cylindrical rubber seal 7 and a cylindrical soundproofing member 30 fabricated of a polyamide-series plastic containing oil are attached to lower bush 6. Tool 3 moves up and down in contact with soundproofing member 30 and seal 7, thereby secondly preventing the noise made in the course of hitting tool 3 by piston 1.

In the hitting stroke of hydraulic hammer 10, the oil filling an accumulator 8 and the high-pressure oil from a pump 20 are provided to the upper and lower parts of piston 1, and thus piston 1 descends rapidly and hit tool 3. In this course, very big crashing sound and strong vibration are generated between tool 3 and piston 1 and with the reaction force from the crash, tool 3 crushes a rock 31. Unless the airtight state between tool 3 and upper bush 5 and/or soundproofing member 30 is maintained, the noise will leak out.

Even though tool 3 and lower bush 6 are made of metals, tool 3 makes up-and-down motions in contact with plastic soundproofing member 30 containing oil, not in a direct contact with lower bush 6.

Due to a small frictional coefficient of the plastic used for soundproofing member 30, the frictional heat and the abrasion between the contact surfaces can be prevented, and the plastic containing oil obviates the necessity for periodically providing oil.

Further, despite the possible blow-in of dust and/or grains of sand between tool 3 and lower bush 6 in the course of crushing a rock, they stick into plastic soundproofing member 30. Thus, a severe abrasion of the contact surface of tool 3 can be prevented. That is, the noise from the crash of piston 1 and tool 3 in hydraulic hammer 10 can be sealed not to be heard outside.

Further again, unlike a conventional hydraulic hammer where the piston is damaged along with the damage to the tool, piston 1, according to the present invention, remains intact in spite of the damage of tool 3 since polyamide plastic upper bush 5 serves as a buffer against impact transferred from tool 3.

As described above, since the abrasion-resistant hydraulic hammer with a low noise level according to the present invention makes possible a long sealing of noise, the deterioration of working environments can be prevented and the life of the hammer can be extended.

What is claimed:

1. An abrasion-resistant hydraulic hammer with a noise level lower than a conventional hydraulic hammer comprising:
   - a body;
   - a piston installed inside said body for moving up and down;
   - a tool having a circumferential surface and two opposite ends, inserted into a hole formed in said body under said piston, said tool meeting said piston when said piston descends;
   - a cylindrical bushing lining the hole of said body; and at least one cylindrical plastic member for guiding said tool, located between said bush and said tool contacting the circuferential surface of said tool, said cylindrical plastic member containing oil in its composition.

2. An abrasion-resistant hydraulic hammer with a low noise level as in claim 1, wherein at least one cylindrical plastic member is of a polyamide-series containing oil.

3. An abrasion-resistant hydraulic hammer with a low noise level as in claim 1, further comprising an additional cylindrical plastic member containing an amount of oil in its composition installed between the circumferential surface of said tool and said body, at an end of said tool opposite the end where at least one cylindrical plastic member is located.

* * * * *